(12) United States Patent
Matsuu

(10) Patent No.: US 10,777,814 B2
(45) Date of Patent: Sep. 15, 2020

(54) POSITIVE ELECTRODE ACTIVE MATERIAL, POSITIVE ELECTRODE, AND LITHIUM-ION SECONDARY BATTERY

(71) Applicant: NEC ENERGY DEVICES, LTD., Sagamihara-shi, Kanagawa (JP)

(72) Inventor: Masaaki Matsuu, Kanagawa (JP)

(73) Assignee: Envision AESC Energy Devices Ltd., Sagamihara-shi, Kanagawa (JP)

( * ) Notice: Subject to any disclaimer, the term of this patent is extended or adjusted under 35 U.S.C. 154(b) by 0 days.

(21) Appl. No.: 15/755,164

(22) PCT Filed: Jun. 20, 2016

(86) PCT No.: PCT/JP2016/068255
§ 371 (c)(1),
(2) Date: Feb. 26, 2018

(87) PCT Pub. No.: WO2017/056585
PCT Pub. Date: Apr. 6, 2017

(65) Prior Publication Data
US 2018/0254482 A1    Sep. 6, 2018

(30) Foreign Application Priority Data
Sep. 30, 2015    (JP) .................................. 2015-192852

(51) Int. Cl.
*H01M 4/525*    (2010.01)
*H01M 4/505*    (2010.01)
(Continued)

(52) U.S. Cl.
CPC .......... *H01M 4/525* (2013.01); *H01M 4/131* (2013.01); *H01M 4/136* (2013.01); *H01M 4/364* (2013.01);
(Continued)

(58) Field of Classification Search
CPC ................................ H01M 5/25; H01M 4/364
See application file for complete search history.

(56) References Cited

U.S. PATENT DOCUMENTS

| 2001/0031399 A1 | 10/2001 | Jung et al. | |
|---|---|---|---|
| 2006/0204845 A1* | 9/2006 | Chang | H01M 4/364 429/209 |

(Continued)

FOREIGN PATENT DOCUMENTS

| JP | 06-267539 A | 9/1994 | |
|---|---|---|---|
| JP | 11-162466 | * 6/1999 | ............ H01M 4/525 |

(Continued)

OTHER PUBLICATIONS

Machine translation of JP11-162466 printed Sep. 27, 2019.*
(Continued)

*Primary Examiner* — Maria Laios
(74) *Attorney, Agent, or Firm* — Sughrue Mion, PLLC

(57) ABSTRACT

A positive electrode active material of the present invention is used for a positive electrode for a lithium-ion secondary battery and includes a positive electrode active material particle A expressed by General Formula (A): $Li_\alpha Ni_x Co_y Mn_{(1-x-y)}O_2$ (where $0<\alpha\leq1.15$, $0.7\leq x\leq0.9$, $0<y\leq0.2$, and $0<(1-x-y)$); and one kind or two or more kinds of positive electrode active material particles B selected from a positive electrode active material particle $B_1$ expressed by General Formula $(B_1)$: $Li_\beta Ni_a Co_b Al_{(1-a-b)}O_2$ (where $0<\beta\leq1.15$, $0.7\leq a\leq0.9$, $0<b\leq0.2$, and $0<(1-a-b)$), a positive electrode active material particle $B_2$ expressed by General Formula $(B_2)$: $Li_\beta Ni_a Co_b Mn_{(1-a-b)}O_2$ (where $0<\beta\leq1.15$, $0.2\leq a\leq0.6$, $0<b\leq0.8$, and $0<(1-a-b)$), a positive electrode active material particle $B_3$ expressed by General Formula $(B_3)$: $Li_{\beta+\gamma}Mn_{(2-a-\gamma)}Me_a O_4$ (where $0<\beta\leq1.0$, $0\leq\gamma\leq0.3$, $0\leq a\leq0.5$, and Me is one kind or two or more kinds selected from Li, B, Mg, Al, Fe, Co, and Ni), and a positive electrode active (Continued)

material particle $B_4$ expressed by General Formula ($B_4$): $Li_\beta MPO_4$ (where $0<\beta \leq 1.15$ and M is one kind or two or more kinds selected from Fe, Co, Ni, Mn, and Cu).

4 Claims, 2 Drawing Sheets

(51) Int. Cl.
    *H01M 4/131*         (2010.01)
    *H01M 4/58*          (2010.01)
    *H01M 4/136*         (2010.01)
    *H01M 4/36*          (2006.01)
    *H01M 10/0525*       (2010.01)
    *H01M 4/02*          (2006.01)

(52) U.S. Cl.
    CPC ......... *H01M 4/505* (2013.01); *H01M 4/5825* (2013.01); *H01M 10/0525* (2013.01); *H01M 2004/028* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2007/0141468 A1 | 6/2007 | Barker |
| 2010/0099027 A1 | 4/2010 | Kikuya et al. |
| 2011/0053004 A1* | 3/2011 | Saruwatari ........ H01M 10/0525 429/342 |
| 2013/0084492 A1* | 4/2013 | Yanagita ............... H01M 4/366 429/200 |
| 2014/0045067 A1 | 2/2014 | Cho et al. |

FOREIGN PATENT DOCUMENTS

| | | |
|---|---|---|
| JP | 11-162466 A | 6/1999 |
| JP | 2002-319398 A | 10/2002 |
| JP | 2008-532221 A | 8/2008 |
| JP | 2008-251532 A | 10/2008 |
| JP | 2008-277309 A | 11/2008 |
| JP | 2012-043682 A | 3/2012 |
| JP | 2013-077421 A | 4/2013 |
| JP | 2013-122927 A | 6/2013 |
| JP | 2014-515171 A | 6/2014 |
| JP | 2015-069969 A | 4/2015 |
| WO | 2008/123011 A1 | 10/2008 |

OTHER PUBLICATIONS

International Search Report of PCT/JP2016/068255 dated Aug. 16, 2016 [PCT/ISA/210].

Extended European Search Report dated Feb. 18, 2019, from the European Patent Office in counterpart European Application No. 16850762.2.

\* cited by examiner

POSITIVE ELECTRODE ACTIVE MATERIAL, POSITIVE ELECTRODE, AND LITHIUM-ION SECONDARY BATTERY

CROSS REFERENCE TO RELATED APPLICATIONS

This application is a National Stage of International Application No. PCT/JP2016/068255, filed Jun. 20, 2016, claiming priority based on Japanese Patent Application No. 2015-192852, filed Sep. 30, 2015.

TECHNICAL FIELD

The present invention relates to a positive electrode active material, a positive electrode, and a lithium-ion secondary battery.

BACKGROUND ART

Lithium-ion secondary batteries are in wide use as power sources for small-sized mobile instruments such as mobile phones and laptop computers for having high energy density and excellent charging and discharging cycle characteristics.

In addition, recently, in accordance with consideration of an environmental problem and rising awareness of energy saving, there is also a growing demand for large-sized batteries which are used as power sources in electric vehicles, hybrid electric vehicles, the electricity storage field, and the like and are required to have a large capacity and a long life span.

Generally, a lithium-ion secondary battery is mainly made of a negative electrode in which a carbon material capable of storing and releasing lithium ion is included as a negative electrode active material, a positive electrode in which a lithium composite oxide capable of storing and releasing lithium ion is included as a positive electrode active material, a separator which separates the negative electrode and the positive electrode from each other, and a nonaqueous electrolytic solution which is a nonaqueous solvent having lithium salt dissolved therein.

As exterior materials for lithium-ion secondary batteries, in place of metal cans, thin metal films which can be reduced in weight and thickness and can freely employ a shape compared to metal cans, or laminate films in which a thin metal and a heat-fusible resin film are layered are also in use.

Aiming at increasing the capacity, lengthening the life span, and improving the mass production stability, lithium-ion secondary batteries are required to be further improved in characteristics.

Examples of countermeasures for increasing the capacity of lithium-ion secondary batteries include methods disclosed in Patent Document 1 (Japanese Unexamined Patent Publication No. H6-267539) and Patent Document 2 (Japanese Unexamined Patent Publication No. 2002-319398).

Patent Document 1 discloses a technology of making a positive electrode active material to be a nickel composite oxide by replacing a part of lithium nickelate or nickel with a transition metal.

In addition, Patent Document 2 discloses a technology of mixing a lithium nickel composite oxide in which a heteroelement is introduced and a lithium cobalt composite oxide in which a heteroelement is introduced, for use.

RELATED DOCUMENT

Patent Document

[Patent Document 1] Japanese Unexamined Patent Publication No. H6-267539

[Patent Document 2] Japanese Unexamined Patent Publication No. 2002-319398

SUMMARY OF THE INVENTION

Technical Problem

However, a lithium nickel composite oxide as a positive electrode active material tends to have inferior life characteristics compared to other positive electrode active materials in practical use. The inferior life characteristics hinder the lithium nickel composite oxide from being practically applied to lithium-ion secondary batteries.

Therefore, lithium-ion secondary batteries are required to have a large capacity and improved life characteristics.

The present invention has been made in consideration of the foregoing circumstances and provides a positive electrode active material which has sufficient energy density and is capable of realizing a lithium-ion secondary battery having improved life characteristics, and a lithium-ion secondary battery which has sufficient energy density and has improved life characteristics.

Solution to Problem

According to the present invention, there is provided a positive electrode active material used for a positive electrode for a lithium-ion secondary battery. The positive electrode active material includes a positive electrode active material particle A expressed by General Formula (A): $Li_\alpha Ni_x Co_y Mn_{(1-x-y)} O_2$ (where $0<\alpha \leq 1.15$, $0.7 \leq x \leq 0.9$, $0<y \leq 0.2$, and $0<(1-x-y)$); and one kind or two or more kinds of positive electrode active material particles B selected from a positive electrode active material particle $B_1$ expressed by General Formula $(B_1)$: $Li_\beta Ni_a Co_b Al_{(1-a-b)} O_2$ (where $0<\beta \leq 1.15$, $0.7 \leq a \leq 0.9$, $0<b \leq 0.2$, and $0<(1-a-b)$), a positive electrode active material particle $B_2$ expressed by General Formula $(B_2)$: $Li_\beta Ni_a Co_b Mn_{(1-a-b)} O_2$ (where $0<\beta \leq 1.15$, $0.2 \leq a \leq 0.6$, $0<b \leq 0.8$, and $0<(1-a-b)$), a positive electrode active material particle $B_3$ expressed by General Formula $(B_3)$: $Li_{\beta+\gamma} Mn_{(2-a-\gamma)} Me_a O_4$ (where $0<\beta \leq 1.0$, $0 \leq \gamma \leq 0.3$, $0 \leq a \leq 0.5$, and Me is one kind or two or more kinds selected from Li, B, Mg, Al, Fe, Co, and Ni), and a positive electrode active material particle $B_4$ expressed by General Formula $(B_4)$: $Li_\beta MPO_4$ (where $0<\beta \leq 1.15$ and M is one kind or two or more kinds selected from Fe, Co, Ni, Mn, and Cu).

In addition, according to the present invention, there is provided a positive electrode including a positive electrode active material layer that includes the positive electrode active material, a binding agent, and a conductive assistant.

In addition, according to the present invention, there is provided a lithium-ion secondary battery including at least a negative electrode that allows lithium to be inserted in and to escape from, an electrolytic solution, and the positive electrode.

Advantageous Effects of Invention

According to the present invention, it is possible to provide a positive electrode active material which has sufficient energy density and is capable of realizing a lithium-ion secondary battery having improved life characteristics, and a lithium-ion secondary battery which has sufficient energy density and has improved life characteristics.

BRIEF DESCRIPTION OF THE DRAWINGS

The objects, other objects, the features, and the advantages described above become clearer by a preferable embodiment and the accompanying drawings described below.

DESCRIPTION OF EMBODIMENTS

Figure 1:
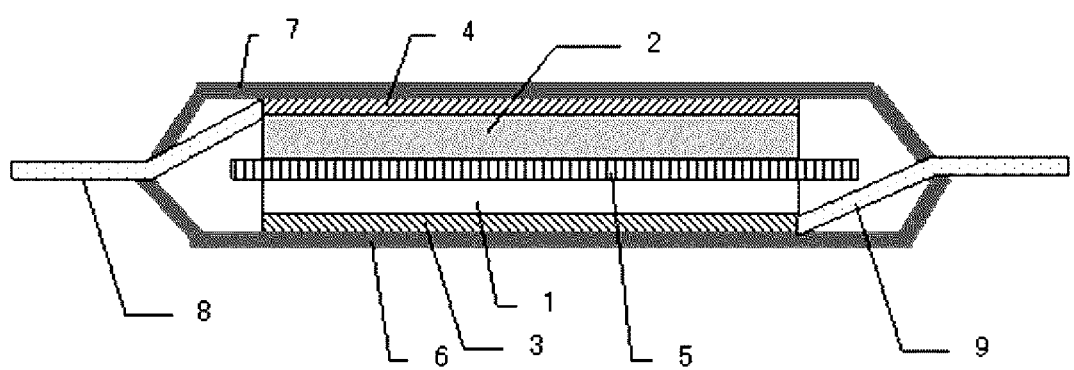
FIG. 1 is a cross-sectional view illustrating an example of a structure of a lithium-ion secondary battery according to an embodiment of the present invention.

Hereinafter, an embodiment of the present invention will be described using the drawings. In addition, in diagrams, being different from the actual dimensions, the shape, the size, and the disposition relationship are schematically illustrated for each of the constituent elements to the extent that the present invention can be understood. In addition, unless otherwise noted, "to" in numerical value ranges indicates a range of equal to or more than a number and equal to or less than the other number.

<Positive Electrode Active Material>

According to the present embodiment, a positive electrode active material includes a positive electrode active material particle A expressed by General Formula (A): $Li_\alpha Ni_x Co_y Mn_{(1-x-y)} O_2$ (where $0<\alpha\le1.15$, $0.7\le x\le0.9$, $0<y\le0.2$, and $0<(1-x-y)$); and one kind or two or more kinds of positive electrode active material particles B selected from a positive electrode active material particle $B_1$ expressed by General Formula ($B_1$): $Li_\beta Ni_a Co_b Al_{(1-a-b)} O_2$ (where $0<\beta\le1.15$, $0.7\le a\le0.9$, $0<b\le0.2$, and $0<(1-a-b)$), a positive electrode active material particle $B_2$ expressed by General Formula ($B_2$): $Li_\beta Ni_a Co_b Mn_{(1-a-b)} O_2$ (where $0<\beta\le1.15$, $0.2\le a\le0.6$, $0<b\le0.8$, and $0<(1-a-b)$), a positive electrode active material particle $B_3$ expressed by General Formula ($B_3$): $Li_{\beta+\gamma} Mn_{(2-a-\gamma)} Me_a O_4$ (where $0<\beta\le1.0$, $0\le\gamma\le0.3$, $0\le a\le0.5$, and Me is one kind or two or more kinds selected from Li, B, Mg, Al, Fe, Co, and Ni), and a positive electrode active material particle $B_4$ expressed by General Formula ($B_4$): $Li_\beta MPO_4$ (where $0<\beta\le1.15$ and M is one kind or two or more kinds selected from Fe, Co, Ni, Mn, and Cu).

Here, for example, it is preferable that the positive electrode active material particle A, the positive electrode active material particle $B_1$, and the positive electrode active material particle $B_2$ have lamellar crystal structures. For example, it is preferable that the positive electrode active material particle $B_3$ has a spinel structure. For example, it is preferable that the positive electrode active material particle $B_4$ has an olivine structure.

According to the positive electrode active material of the present embodiment, it is possible to realize a lithium-ion secondary battery having sufficient energy density and improved life characteristics.

Although the reason for being capable of realizing such a lithium-ion secondary battery is not necessarily clarified, the following reasons are conceivable.

Among nickel composite oxides having a lamellar crystal structure, a nickel composite oxide particularly having a high Ni-ratio has a large charge/discharge capacity compared to other positive electrode active materials in practical use. However, a particle crack occurs due to expansion and contraction of a particle during a charge/discharge cycle, and this particle crack causes disconnection of a conductive path, so that a phenomenon of a capacity drop occurs.

In addition, in a case where a current flows for charging and discharging a lithium-ion secondary battery, resistance polarization in the thickness direction occurs inside a positive electrode active material layer. Then, charge/discharge reaction occurs by priority in a positive electrode active material particle present around a positive electrode active material layer surface on a side facing a negative electrode, and charge/discharge reaction occurs in a positive electrode active material particle around a positive electrode current collector side with a delay. In a case where a current larger than that in the related art flows due to an increased capacity or an increased output of the lithium-ion secondary battery, the resistance polarization in the thickness direction inside the positive electrode active material layer also increases, thereby resulting in a phenomenon of uneven intralayer charge/discharge reaction, that is charge/discharge reaction of only the positive electrode active material particle present around the positive electrode active material layer surface on the side facing the negative electrode.

When the cycle of such uneven intralayer charge/discharge reaction is repeated, charge/discharge reaction occurs in only the positive electrode active material particle present around the positive electrode active material layer surface on the side facing the negative electrode. Therefore, a capacity drop of the positive electrode active material particle present around the positive electrode active material layer surface on the side facing the negative electrode is likely to occur within a few repeat counts. When the capacity of a positive electrode active material particle drops, charge/discharge reaction occurs, by priority due to uneven intralayer reaction, in a positive electrode active material particle present on the current collector side immediately next to the positive electrode active material particle of which the capacity has dropped. Therefore, a capacity drop also occurs in this positive electrode active material particle within a few repeat counts of repetitive charging and discharging, and the further repeated cycles result in a phenomenon in which the capacity deterioration of the positive electrode active material particle inside the positive electrode active material layer progresses rapidly from the side facing the negative electrode to the current collector side. As a result, the cycle the characteristics of the lithium-ion secondary battery suddenly deteriorate.

Figure 2:
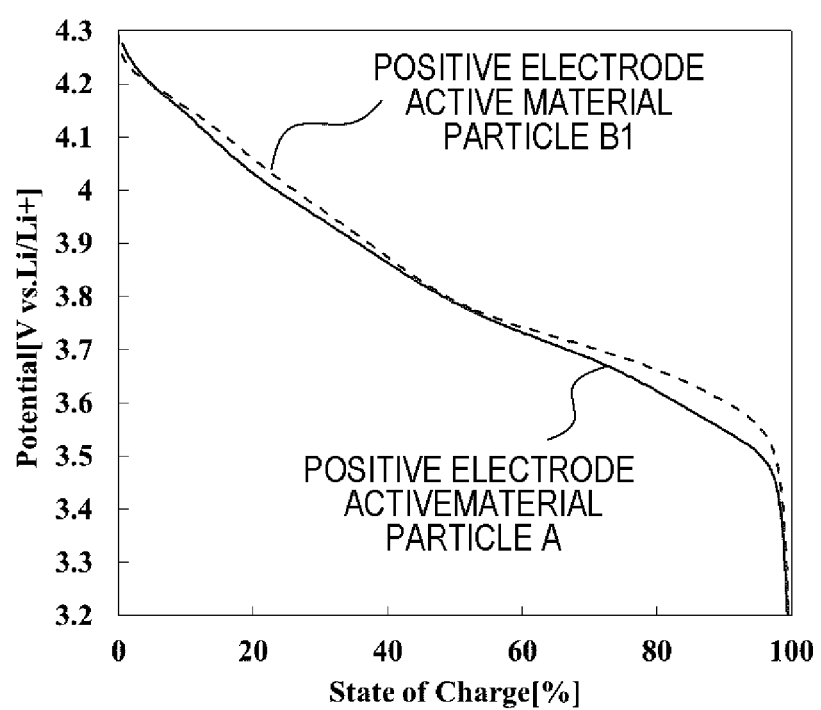
FIG. 2 is a view illustrating a change in a reaction potential in charging and discharging of a positive electrode active material particle A and a positive electrode active material particle $B_1$.

For example, the positive electrode active material particle A and the positive electrode active material particle B have specific capacities substantially equal to each other. However, since their ratios are different from that of an element replacing a part of nickel, the reaction potential of charging and discharging is slightly different as in FIG. 2. In a case where the positive electrode active material particle A and the positive electrode active material particle $B_1$ are present inside the positive electrode active material layer, even when charge/discharge reaction is occurring around the positive electrode active material layer surface on the side facing the negative electrode due to uneven intralayer charge/discharge reaction, charge/discharge reaction can also occur in the positive electrode active material particle having low reaction potential and being present around the current collector side. Accordingly, charge/discharge reaction in the positive electrode active material particle inside the positive electrode active material layer as a whole can be charge/discharge reaction evener than that in the related art. As a result, the capacity of a positive electrode active material particle present on around the positive electrode active material layer surface on the side facing the negative electrode is prevented from deteriorating by priority, and thus it is possible to suppress sudden capacity deterioration inside the positive electrode active material layer subsequent thereto.

As a result, it is assumed that a lithium-ion secondary battery having high energy density and a long life span can be provided.

In addition, the positive electrode active material particle A having a lamellar crystal structure can be manufactured to be reduced in lithium residuals which cause occurrence of cracked gas resulted from charging and discharging. In contrast, the positive electrode active material particle B tends to have many lithium residuals.

When the mixed quantity of the positive electrode active material particle A and the positive electrode active material particle B is adjusted having a mixture ratio equal to or lower than a threshold value at which no outstanding cracked gas is generated, it is possible to manufacture a lithium-ion secondary battery in which cubical expansion caused due to cracked gas resulted from charging and discharging is further reduced.

In the mixture ratio of the positive electrode active material particle A and the positive electrode active material particle B, when the sum of the positive electrode active material particle A and the positive electrode active material particle B is 100 parts by mass, it is preferable that the blending quantity of the positive electrode active material particle A ranges of equal to or more than 3 parts by mass and equal to or lower than 97 parts by mass, and the blending quantity of the positive electrode active material particle B ranges of equal to or more than 3 parts by mass and equal to or lower than 97 parts by mass. From the viewpoint of further suppressing the occurrence of cracked gas during charging and discharging, it is more preferable that the blending quantity of the positive electrode active material particle A ranges of equal to or more than 40 parts by mass and equal to or lower than 97 parts by mass and the blending quantity of the positive electrode active material particle B ranges of equal to or more than 3 parts by mass and equal to or lower than 60 parts by mass. It is particularly preferable that the blending quantity of the positive electrode active material particle A ranges of equal to or more than 70 parts by mass and equal to or lower than 97 parts by mass and the blending quantity of the positive electrode active material particle B ranges of equal to or more than 3 parts by mass and equal to or lower than 30 parts by mass.

In the positive electrode active material particle A expressed by General Formula (A): $Li_\alpha Ni_x Co_y Mn_{(1-x-y)} O_2$ (where $0<\alpha \leq 1.15$, $0.7 \leq x \leq 0.9$, $0<y \leq 0.2$, and $0<(1-x-y)$), the factor $\alpha$ preferably ranges of equal to or greater than 0.8 and equal to or smaller than 1.10 and more preferably ranges of equal to or greater than 0.95 and equal to or smaller than 1.05. The factor x preferably ranges of equal to or greater than 0.75 and equal to or smaller than 0.85. The factor y preferably ranges of equal to or greater than 0.05 and equal to or smaller than 0.15.

In the positive electrode active material particle $B_1$ expressed by General Formula ($B_1$): $Li_\beta Ni_a Co_b Al_{(1-a-b)} O_2$ (where $0<\beta \leq 1.15$, $0.7 \leq a \leq 0.9$, $0<b \leq 0.2$, and $0<(1-a-b)$), the factor $\beta$ preferably ranges of equal to or greater than 0.8 and equal to or smaller than 1.10 and more preferably ranges of equal to or greater than 0.95 and equal to or smaller than 1.05. The factor a preferably ranges of equal to or greater than 0.75 and equal to or smaller than 0.85. The factor b preferably ranges of equal to or greater than 0.10 and equal to or smaller than 0.18.

In the positive electrode active material particle $B_2$ expressed by General Formula ($B_2$): $Li_\beta Ni_a Co_b Mn_{(1-a-b)} O_2$ (where $0<\beta \leq 1.15$, $0.2 \leq a \leq 0.6$, $0<b \leq 0.8$, and $0<(1-a-b)$), the factor $\beta$ preferably ranges of equal to or greater than 0.8 and equal to or smaller than 1.10 and more preferably ranges of equal to or greater than 0.95 and equal to or smaller than 1.05. The factor a preferably ranges of equal to or greater than 0.45 and equal to or smaller than 0.55. The factor b preferably ranges of equal to or greater than 0.15 and equal to or smaller than 0.30.

In the positive electrode active material particle $B_3$ expressed by General Formula ($B_3$): $Li_{\beta+\gamma} Mn_{(2-a-\gamma)} Me_a O_4$ (where $0<\beta \leq 1.0$; $0 \leq \gamma \leq 0.3$; $0 \leq a \leq 0.5$; and Me is one kind or two or more kinds selected from Li, B, Mg, Al, Fe, Co, and Ni and is preferably Al), the factor $\beta$ preferably ranges of equal to or greater than 0.8 and equal to or smaller than 1.10 and more preferably ranges of equal to or greater than 0.95 and equal to or smaller than 1.05. The factor $\gamma$ preferably ranges of equal to or greater than 0.05 and equal to or smaller than 0.15 and more preferably ranges of equal to or greater than 0.08 and equal to or smaller than 0.12. The factor a preferably ranges of equal to or greater than 0.02 and equal to or smaller than 0.3 and more preferably ranges of equal to or greater than 0.03 and equal to or smaller than 0.1.

In the positive electrode active material particle $B_4$ expressed by General Formula ($B_4$): $Li_\beta MPO_4$ (where $0<\beta \leq 1.15$, and M is one kind or two or more kinds selected from Fe, Co, Ni, Mn, and Cu and is preferably Fe), the factor $\beta$ preferably ranges of equal to or greater than 0.8 and equal to or smaller than 1.1 and more preferably ranges of equal to or greater than 0.95 and equal to or smaller than 1.05.

A method of manufacturing the positive electrode active material particle A, and the positive electrode active material particles $B_1$ to $B_4$ is not particularly limited, those can be manufactured by a generally known method. For example, the positive electrode active material particle A can be manufactured in accordance with the method disclosed in Japanese Unexamined Patent Publication No. 2012-243572. The positive electrode active material particle $B_1$ can be manufactured in accordance with the method disclosed in Japanese Patent Application No. 3897387. The positive electrode active material particle $B_2$ can be manufactured in accordance with the method disclosed in Japanese Patent Application No. 4217710. The positive electrode active material particle $B_3$ can be manufactured in accordance with the method disclosed in Japanese Patent Application No. 3900328. The positive electrode active material particle $B_4$ can be manufactured in accordance with the method disclosed in Japanese Patent Application No. 4350496.

<Positive Electrode>

A positive electrode of the present embodiment includes a positive electrode active material layer that includes the positive electrode active material of the present embodiment, a binding agent, and a conductive assistant as necessary.

In addition, for example, the positive electrode of the present embodiment includes a current collector and a positive electrode active material layer provided on the current collector.

According to the present embodiment, the positive electrode active material layer contains the positive electrode active material particle A expressed by General Formula (A): $Li_\alpha Ni_x Co_y Mn_{(1-x-y)} O_2$ (where $0<\alpha \leq 1.15$, $0.7 \leq x \leq 0.9$, $0<y \leq 0.2$, and $0<(1-x-y)$); and one kind or two or more kinds of positive electrode active material particles B selected from the positive electrode active material particle $B_1$ expressed by General Formula ($B_1$): $Li_\beta Ni_a Co_b Al_{(1-a-b)}$ $O_2$ (where $0<\beta\leq1.15$, $0.7\leq a\leq0.9$, $0<b\leq0.2$, and $0<(1-a-b)$), the positive electrode active material particle $B_2$ expressed by General Formula ($B_2$): $Li_\beta Ni_a Co_b Mn_{(1-a-b)} O_2$ (where $0<\beta\leq1.15$, $0.2\leq a\leq0.6$, $0<b\leq0.8$, and $0<(1-a-b)$), the positive electrode active material particle $B_3$ expressed by General Formula ($B_3$): $Li_{\beta+\gamma} Mn_{(2-a-\gamma)} Me_a O_4$ (where $0<\beta\leq1.0$, $0\leq\gamma\leq0.3$, $0\leq a\leq0.5$, and Me is one kind or two or more kinds selected from Li, B, Mg, Al, Fe, Co, and Ni), and the positive electrode active material particle $B_4$ expressed by General Formula ($B_4$): $Li_\beta MPO_4$ (where $0<\beta\leq1.15$ and M is one kind or two or more kinds selected from Fe, Co, Ni, Mn, and Cu).

The positive electrode active material layer of the present embodiment may include other positive electrode active materials. From the viewpoint of the energy density, when the entire positive electrode active material layer is 100 mass %, the sum content of the positive electrode active material particle A and the positive electrode active material particle B in the positive electrode active material layer is preferably equal to or more than 50 mass %, is more preferably equal to or more than 75 mass %, is further more preferably equal to or more than 90 mass %, and is particularly preferably equal to or more than 95 mass %. The upper limit for the sum content of the positive electrode active material particle A and the positive electrode active material particle B in the positive electrode active material layer is not particularly limited and is equal to or less than 100 mass %, for example.

The thickness of the positive electrode active material layer is not particularly limited and can be suitably set in accordance with desired characteristics. For example, from the viewpoint of the energy density, the positive electrode active material layer can be set to be thick. Otherwise, from the viewpoint of the output characteristics, the positive electrode active material layer can be set to be thin. For example, the thickness of the positive electrode active material layer can be suitably to range from 10 μm to 250 μm, can be preferably set to range from 20 μm to 200 μm, can be more preferably set to range from 50 μm to 180 μm.

The positive electrode active material layer may contain a conductive assistant as necessary. The conductive assistant is not particularly limited. For example, it is possible to use an ordinary conductive assistant such as carbon black, Ketjenblack, acetylene black, natural graphite, artificial graphite, and carbon fiber.

In addition, the positive electrode active material layer may contain a binding agent as necessary. The binding agent is not particularly limited. For example, in a case where N-methyl-pyrrolidone (NMP) is used as the solvent, it is possible to use an ordinary binding agent such as polytetrafluoroethylene (PTFE) and polyvinylidene fluoride (PVDF). In a case where water is used as the solvent, it is possible to use an ordinary binding agent such as styrene butadiene-based rubber. Moreover, it is possible to use an ordinary thickener such as carboxymethyl cellulose, methyl cellulose, and hydroxymethyl cellulose.

When the entire positive electrode active material layer is 100 mass %, the conductive assistant content in the positive electrode active material layer preferably ranges from 0.1 mass % to 10 mass % and more preferably ranges from 1 mass % to 10 mass %.

When the entire positive electrode active material layer is 100 mass %, the binding agent content in the positive electrode active material layer preferably ranges from 0.1 mass % to 10 mass % and more preferably ranges from 1 mass % to 10 mass %.

When the ratio of the conductive assistant and the binding agent is equal to or lower than the upper limit value, the proportion of the positive electrode active material for a lithium-ion secondary battery increases and the capacity per weight increases, which is preferable. When the ratio of the conductive assistant and the binding agent is equal to or higher than the lower limit value, the conductivity becomes more favorable and the electrode peeling is suppressed, which is preferable.

In addition, it is preferable that the density of the positive electrode active material layer ranges from 2.55 $g/cm^3$ to 3.45 $g/cm^3$. When the density of the positive electrode active material layer is within the range, the discharge capacity when in use at a high discharge rate is improved, which is preferable.

As the positive electrode current collector, it is possible to use aluminum, stainless steel, nickel, titanium, an alloy thereof, or the like. Examples of the shape thereof include foil, a flat plate shape, and a mesh shape. Particularly, aluminum foil can be preferably used.

<Lithium-Ion Secondary Battery>

Subsequently, a lithium-ion secondary battery 10 of the present embodiment will be described. FIG. 1 is a cross-sectional view illustrating an example (laminate-type) of a structure of the lithium-ion secondary battery 10 according to the embodiment of the present invention. As illustrated in FIG. 1, the lithium-ion secondary battery 10 of the present embodiment includes a negative electrode that allows lithium to be inserted in and to escape from, an electrolytic solution, and the positive electrode of the present embodiment. In addition, a separator 5 can be provided between the positive electrode and the negative electrode. A plurality of electrode pairs of the positive electrode and the negative electrode can be provided.

For example, the lithium-ion secondary battery 10 has a positive electrode which is constituted by a positive electrode current collector 3 made of a metal such as aluminum foil, and a positive electrode active material layer 1 containing a positive electrode active material provided thereon; and a negative electrode which is constituted by a negative electrode current collector 4 made of a metal such as copper foil, and a negative electrode active material layer 2 containing a negative electrode active material provided thereon. For example, the positive electrode and the negative electrode are layered via the separator 5 made of non-woven fabric, polypropylene microporous membrane, or the like such that the positive electrode active material layer 1 and the negative electrode active material layer 2 face each other. For example, the electrode pair is accommodated inside a container formed with exterior bodies 6 and 7 made of aluminum laminate films. A positive electrode tab 9 is connected to the positive electrode current collector 3, and a negative electrode tab 8 is connected to the negative electrode current collector 4. These tabs are drawn out from the container. The electrolytic solution is injected into the container and the container is sealed. It is possible to have a structure accommodating groups of electrodes, in which a plurality of electrode pairs are layered, inside the container. In the present embodiment, the drawings are exaggerated for convenience of description, and the technical scope of the present invention is not limited to the form illustrated in the drawings.

The lithium-ion secondary battery 10 of the present embodiment can be produced in accordance with a known method.

For example, a layered body or a wound body can be used as an electrode. As an exterior body, a metal exterior body or an aluminum laminate exterior body can be suitably used.

The shape of a battery may be any shape of a coin type, a button type, a sheet type, a cylinder type, a square type, a flat type, and the like.

(Negative Electrode)

The negative electrode of the present embodiment is provided with a negative electrode active material and a negative electrode active material layer which includes a binding agent and a conductive assistant as necessary.

In addition, for example, the negative electrode of the present embodiment includes a current collector and a negative electrode active material layer provided on this current collector.

As the negative electrode active material of the present embodiment, it is possible to use a material which can store and release lithium, such as a lithium metal, a carbon material, and a Si-based material. Examples of the carbon material include graphite, amorphous carbon, diamond-like carbon, fullerene, carbon nanotube, and carbon nanohorn storing lithium. As the Si-based material, it is possible to use Si, $SiO_2$, SiOx ($0<x \leq 2$), a Si-containing composite material, or the like. In addition, a composite including two or more of these materials may be used. In a case where a lithium metal is used as the negative electrode active material, it is possible to form a negative electrode by a suitable method such as a melt cooling method, a liquid quenching method, an atomizing method, a vacuum deposition method, a sputtering method, a plasma CVD method, an optical CVD method, a thermal CVD method, and a sol-gel method. In addition, in a case of a carbon material, it is possible to form the negative electrode by a method in which binding agents such as carbon and polyvinylidene fluoride (PVDF) are mixed, a mixture thereof is dispersed in a solvent such as NMP, and this is coated on the negative electrode current collector, or a method such as a deposition method, a CVD method, and a sputtering method.

In regard to suppressing side reaction during charging and discharging, and suppressing a drop of charge/discharge efficiency, the average particle size of the negative electrode active material is preferably equal to or greater than 1 μm, is more preferably equal to or greater than 2 μm, and is further more preferably equal to or greater than 5 μm. From the viewpoint of input/output characteristics or producing electrodes (such as smoothness of electrode surface), the average particle size thereof is preferably equal to or smaller than 80 μm and is more preferably equal to or smaller than 40 μm. Here, the average particle size denotes a particle size (median diameter: D50) with an integrated value 50% in particle size distribution (based on the volume) by a laser diffraction scattering method.

As necessary, the negative electrode active material layer may contain a conductive assistant or a binding agent. As the conductive assistant or the binding agent, it is possible to use a conductive assistant or a binding agent similar to those which can be used in the positive electrode active material layer described above.

As the negative electrode current collector, it is possible to use copper, stainless steel, nickel, titanium, an alloy thereof, or the like.

(Electrolytic Solution)

As the electrolytic solution, it is possible to use one or a mixture of two or more of organic solvents such as cyclic carbonates such as ethylene carbonate (EC), propylene carbonate (PC), vinylene carbonate (VC), and butylene carbonate (BC); ethyl methyl carbonate (EMC), diethyl carbonate (DEC), chain carbonates such as ethyl methyl carbonate (EMC), diethyl carbonate (DEC), dimethyl carbonate (DMC), and dipropyl carbonate (DPC); aliphatic carboxylic acid esters; γ-lactones such as γ-butyrolactone; chain ethers; cyclic ethers. Moreover, lithium salt can be dissolved in these organic solvents.

The separator is mainly made of a porous resin membrane, woven fabric, non-woven fabric, or the like. As a resin component thereof, for example, it is possible to use a polyolefin resin such as polypropylene and polyethylene, polyester resin, acrylic resin, styrene resin, or nylon resin. Particularly, it is preferable to use a polyolefin-based microporous membrane for being excellent in ion permeability and performance of physically isolating the positive electrode and the negative electrode from each other. In addition, as necessary, a layer including inorganic particles may be formed in the separator. Examples of the inorganic particle can include insulative oxide, nitride, sulfide, and carbide. Among these, it is preferable to include $TiO_2$ or $Al_2O_3$.

As the exterior container, it is possible to use a case made of a flexible film, a can case, or the like. From the viewpoint of reducing weight of a battery, it is preferable to use a flexible film. As the flexible film, it is possible to use a film in which resin layers are provided on front and rear surfaces of a metal layer which serves as a base material. As the metal layer, it is possible to select a film which has barrier properties, such that a leakage of the electrolytic solution or infiltration of moisture from outside is prevented. It is possible to use aluminum, stainless steel, or the like. For example, a heat-fusible resin layer such as modified polyolefin is provided on at least one surface of the metal layer. When the heat-fusible resin layers of the flexible films are caused to face each other and a portion around a part housing the electrode layered body is subjected to heat fusion, an exterior container is formed. It is possible to provide a resin layer such as a nylon film and a polyester film on the surface of the exterior body which is a surface on a side opposite to the surface on which the heat-fusible resin layer is formed.

When manufacturing an electrode, as an apparatus for forming an active material layer on the current collector, it is possible to use a doctor blade, a die coater, a gravure coater, an apparatus executing various coating methods such as a transfer method and a deposition method, or a combination of these coating apparatuses.

In the present embodiment, in order to accurately form a coating end portion of an active material, it is particularly preferable to use a die coater. The coating method for an active material performed by the die coater are broadly divided into two types such as a continuous coating method in which an active material is continuously formed along the longitudinal direction of the elongated current collector, and an intermittent coating method in which coated portions and uncoated portions of the active material are alternately and repetitively formed along the longitudinal direction of the current collector, and it is possible to suitably make selection from these methods.

Hereinabove, the embodiment of the present invention has been described with reference to the drawings. However, those are examples of the present invention, and it is possible to employ various configurations other than those described above.

EXAMPLE

Hereinafter, the present invention will be described using Examples and Comparative Examples. The present invention is not limited to the Examples described below.

Examples 1 to 9

As the positive electrode active material particle A, a nickel composite oxide ($LiNi_{0.8}Co_{0.1}Mn_{0.1}O_2$) having a lamellar crystal structure with the average particle size of 8.4 μm and the BET specific surface area of 0.44 m²/g was prepared. As the positive electrode active material particle B₁, a nickel composite oxide (LiNi$_{0.8}$Co$_{0.15}$Al$_{0.05}$O$_2$) having a lamellar crystal structure with the average particle size of 6.1 μm and the BET specific surface area of 0.5 m²/g was prepared. These positive electrode active material particles and carbon black as a conductive assistant were subjected to dry mixing. An obtained mixture was evenly dispersed in N-methyl-2-pyrrolidone (NMP) in which a vinylidene fluoride resin (PVDF) serving as a binder was dissolved, and slurry was produced, thereby obtaining slurry A. The solid content ratio in the slurry A was set in a manner of positive electrode active material particle A: positive electrode active material particle B₁: conductive assistant: PVDF=89.24: 2.76:4:4 (mass %). In this case, the mass ratio of the positive electrode active material particle A and the positive electrode active material particle B₁ was 97:3.

After aluminum metal foil (thickness of 20 μm) to serve as the positive electrode current collector was coated with the slurry A, NMP was evaporated, and the positive electrode active material layer (membrane thickness of 85 μm) having the positive electrode active material particle A and the positive electrode active material particle B₁ was formed on aluminum metal foil, thereby obtaining a positive electrode sheet of Example 1.

In addition, except that the mixture ratio of the positive electrode active material particle A and the positive electrode active material particle B₁ was changed to the value (mass ratio) shown in Table 1, in a manner similar to Example 1, positive electrode sheets of Example 2 to 9 and Comparative Example 1 and 2 disclosed in Table 1 were produced.

(Evaluation)

Natural graphite was used as the negative electrode active material, which was mixed and dispersed in NMP such that the ratio of natural graphite:PVDF=90:10 (mass %) was achieved, and copper foil (thickness of 10 μm) to be produced as the negative electrode current collector 4 was coated with the mixture. A nonaqueous electrolytic solution having LiPF$_6$ of 1 mol/L dissolved as the electrolyte was used as the electrolytic solution. Thereafter, the negative electrode and the positive electrode were layered via the separator 5 made of polyethylene, and each of the laminate-type secondary batteries was produced.

Using the laminate-type secondary batteries produced by the technique described above, the high-temperature cycle characteristics and the volumes of the secondary batteries after 500 cycle were measured, and the volume increase amounts due to generation of gas inside the secondary batteries were evaluated at the temperature of 45° C. under the conditions of the charge rate of 1.0 C, the discharge rate of 1.0 C, the charging end voltage of 4.2 V, and the discharge cutoff voltage of 2.5 V.

The capacity maintenance factor (%) was a value indicated as 100×C$_{500}$/C$_{10}$ when the discharge capacity (mAh) after 500 cycles was C$_{500}$ and the discharge capacity (mAh) of the tenth cycle was C$_{10}$.

The volume increase amount (%) was a value indicated as 100×(V$_{500}$−V$_0$)/V$_0$ when the volume (cc) of the laminate-type secondary battery after 500 cycles was V$_{500}$ and the volume (cc) of the laminate-type secondary battery before the cycle was V$_0$.

Table 1 collectively shows the obtained capacity maintenance factors and volume increase amounts.

TABLE 1

| | Active material A:Active material B₁ | Discharge capacity in 10th cycle (mAh) | Capacity maintenance factor (%) | Volume increase amount (%) |
|---|---|---|---|---|
| Example 1 | 97:3 | 2236 | 83.6 | 2.6 |
| Example 2 | 90:10 | 2227 | 85.3 | 3.1 |
| Example 3 | 75:25 | 2208 | 85.5 | 4.0 |
| Example 4 | 70:30 | 2201 | 85.8 | 4.2 |
| Example 5 | 60:40 | 2189 | 86.1 | 20.4 |
| Example 6 | 50:50 | 2176 | 86.3 | 40.3 |
| Example 7 | 40:60 | 2163 | 86.6 | 46.1 |
| Example 8 | 10:90 | 2125 | 88.1 | 49.0 |
| Example 9 | 3:97 | 2116 | 88.5 | 49.3 |
| Comparative Example 1 | 100:0 | 2239 | 80.0 | 2.0 |
| Comparative Example 2 | 0:100 | 2113 | 82.3 | 49.6 |

From the comparison of the capacity maintenance factors of Examples and Comparative Examples, it is possible to know that the lithium-ion secondary batteries which have used the positive electrode active materials of Examples have life spans longer than the lithium-ion secondary batteries which have used the positive electrode active materials of Comparative Examples. Therefore, it is possible to understand that the positive electrode active material of the present embodiment can contribute to improvement of long life span characteristics of the lithium-ion secondary batteries.

Moreover, in Example 1 to 4, it is possible to known that the gas generation amounts have been reduced after 500 cycles. Therefore, it is possible to understand that the positive electrode active materials of Examples 1 to 4 can effectively contribute to improvement of long life span characteristics and suppression of the cracked gas generated in accordance with charging and discharging.

Example 11 to 19

As the positive electrode active material particle A, a nickel composite oxide (LiNi$_{0.8}$Co$_{0.1}$Mn$_{0.1}$O$_2$) having a lamellar crystal structure with the average particle size of 8.4 μm and the BET specific surface area of 0.44 m²/g was prepared. As the positive electrode active material particle B₂, a nickel composite oxide (LiNi$_{0.8}$Co$_{0.2}$Mn$_{0.3}$O$_2$) having a lamellar crystal structure with the average particle size of 7.2 μm and the BET specific surface area of 0.3 m²/g was prepared. These positive electrode active material particles and carbon black as a conductive assistant were subjected to dry mixing. An obtained mixture was evenly dispersed in N-methyl-2-pyrrolidone (NMP) in which a vinylidene fluoride resin (PVDF) serving as a binder was dissolved, and slurry was produced, thereby obtaining slurry A. The solid content ratio in the slurry A was set in a manner of positive electrode active material particle A: positive electrode active material particle B₂: conductive assistant: PVDF=89.24: 2.76:4:4 (mass %). In this case, the mass ratio of the positive electrode active material particle A and the positive electrode active material particle B₂ was 97:3.

After aluminum metal foil (thickness of 20 μm) to serve as the positive electrode current collector was coated with the slurry A, NMP was evaporated, and the positive electrode active material layer (membrane thickness of 85 μm) having the positive electrode active material particle A and the positive electrode active material particle B₂ was formed on aluminum metal foil, thereby obtaining a positive electrode sheet of Example 11.

In addition, except that the mixture ratio of the positive electrode active material particle A and the positive electrode active material particle $B_2$ was changed to the value (mass ratio) shown in Table 2, in a manner similar to Example 11, positive electrode sheets of Examples 12 to 19 disclosed in Table 2 were produced.

(Evaluation)

Natural graphite was used as the negative electrode active material, which was mixed and dispersed in NMP such that the ratio of natural graphite:PVDF=90:10 (mass %) was achieved, and copper foil (thickness of 10 μm) to be produced as the negative electrode current collector 4 was coated with the mixture. A nonaqueous electrolytic solution having $LiPF_6$ of 1 mol/L dissolved as the electrolyte was used as the electrolytic solution. Thereafter, the negative electrode and the positive electrode were layered via the separator 5 made of polyethylene, and each of the laminate-type secondary batteries was produced.

Using the laminate-type secondary batteries produced by the technique described above, the high-temperature cycle characteristics were evaluated at the temperature of 45° C. under the conditions of the charge rate of 1.0 C, the discharge rate of 1.0 C, the charging end voltage of 4.2 V, and the discharge cutoff voltage of 2.5 V.

The capacity maintenance factor (%) was a value indicated as $100 \times C_{500}/C_{10}$ when the discharge capacity (mAh) after 500 cycles was $C_{500}$ and the discharge capacity (mAh) of the tenth cycle was $C_{10}$.

Table 2 shows the obtained capacity maintenance factors.

TABLE 2

| | Active material A:Active material $B_2$ | Discharge capacity in 10th cycle (mAh) | Capacity maintenance factor (%) |
|---|---|---|---|
| Example 11 | 97:3 | 2229 | 84.1 |
| Example 12 | 90:10 | 2204 | 85.5 |
| Example 13 | 75:25 | 2152 | 85.8 |
| Example 14 | 70:30 | 2135 | 86.2 |
| Example 15 | 60:40 | 2100 | 86.5 |
| Example 16 | 50:50 | 2065 | 87.1 |
| Example 17 | 40:60 | 2030 | 87.6 |
| Example 18 | 10:90 | 1925 | 88.4 |
| Example 19 | 3:97 | 1901 | 88.6 |
| Comparative Example 1 | 100:0 | 2239 | 80.0 |

From the comparison of the capacity maintenance factors of Examples and Comparative Examples, it is possible to know that the lithium-ion secondary batteries which have used the positive electrode active materials of Examples have life spans longer than the lithium-ion secondary batteries which have used the positive electrode active materials of Comparative Examples. Therefore, it is possible to understand that the positive electrode active material of the present embodiment can contribute to improvement of long life span characteristics of the lithium-ion secondary batteries.

Examples 21 to 27

As the positive electrode active material particle A, a nickel composite oxide ($LiNi_{0.8}Co_{0.1}Mn_{0.1}O_2$) having a lamellar crystal structure with the average particle size of 8.4 μm and the BET specific surface area of 0.44 m²/g was prepared. As the positive electrode active material particle $B_3$, a manganese composite oxide ($Li_{1.09}Mn_{1.87}Al_{0.04}O_4$) having a spinel structure with the average particle size of 9.8 μm and the BET specific surface area of 0.6 m²/g was prepared. These positive electrode active material particles and carbon black as a conductive assistant were subjected to dry mixing. An obtained mixture was evenly dispersed in N-methyl-2-pyrrolidone (NMP) in which a vinylidene fluoride resin (PVDF) serving as a binder was dissolved, and slurry was produced, thereby obtaining slurry A. The solid content ratio in the slurry A was set in a manner of positive electrode active material particle A: positive electrode active material particle $B_3$: conductive assistant: PVDF=89.24: 2.76:4:4 (mass %). In this case, the mass ratio of the positive electrode active material particle A and the positive electrode active material particle $B_3$ was 97:3.

After aluminum metal foil (thickness of 20 μm) to serve as the positive electrode current collector was coated with the slurry A, NMP was evaporated, and the positive electrode active material layer (membrane thickness of 85 μm) having the positive electrode active material particle A and the positive electrode active material particle $B_3$ was formed on aluminum metal foil, thereby obtaining a positive electrode sheet of Example 21.

In addition, except that the mixture ratio of the positive electrode active material particle A and the positive electrode active material particle $B_3$ was changed to the value (mass ratio) shown in Table 3, in a manner similar to Example 21, positive electrode sheets of Examples 22 to 27 and Comparative Example 3 disclosed in Table 3 were produced.

(Evaluation)

Natural graphite was used as the negative electrode active material, which was mixed and dispersed in NMP such that the ratio of natural graphite:PVDF=90:10 (mass %) was achieved, and copper foil (thickness of 10 μm) to be produced as the negative electrode current collector 4 was coated with the mixture. A nonaqueous electrolytic solution having $LiPF_6$ of 1 mol/L dissolved as the electrolyte was used as the electrolytic solution. Thereafter, the negative electrode and the positive electrode were layered via the separator 5 made of polyethylene, and each of the laminate-type secondary batteries was produced.

Using the laminate-type secondary batteries produced by the technique described above, the high-temperature cycle characteristics were evaluated at the temperature of 45° C. under the conditions of the charge rate of 1.0 C, the discharge rate of 1.0 C, the charging end voltage of 4.2 V, and the discharge cutoff voltage of 2.5 V.

The capacity maintenance factor (%) was a value indicated as $100 \times C_{500}/C_{10}$ when the discharge capacity (mAh) after 500 cycles was $C_{500}$ and the discharge capacity (mAh) of the tenth cycle was $C_{10}$.

Table 3 shows the obtained capacity maintenance factors.

TABLE 3

| | Active material A:Active material $B_3$ | Discharge capacity in 10th cycle (mAh) | Capacity maintenance factor (%) | Resistance increase rate |
|---|---|---|---|---|
| Example 21 | 97:3 | 2204 | 83.2 | 1.15 |
| Example 22 | 90:10 | 2121 | 84.2 | 1.18 |
| Example 23 | 75:25 | 1945 | 84.5 | 1.22 |
| Example 24 | 70:30 | 1886 | 84.6 | 1.25 |
| Example 25 | 60:40 | 1768 | 83.8 | 1.32 |
| Example 26 | 50:50 | 1650 | 83.6 | 1.39 |
| Example 27 | 40:60 | 1532 | 82.1 | 1.43 |
| Comparative Example 1 | 100:0 | 2239 | 80.0 | 1.90 |
| Comparative Example 3 | 0:100 | 1060 | 70.1 | 1.14 |

From the comparison of the capacity maintenance factors of Examples and Comparative Examples, it is possible to know that the lithium-ion secondary batteries which have used the positive electrode active materials of Examples have life spans longer than the lithium-ion secondary batteries which have used the positive electrode active materials of Comparative Examples. Therefore, it is possible to understand that the positive electrode active material of the present embodiment can contribute to improvement of long life span characteristics of the lithium-ion secondary batteries.

Moreover, in Examples 21 to 27, it is possible to known that the resistance increase rates have been reduced after 500 cycles. Therefore, it is possible to understand that the positive electrode active materials of Examples 21 to 27 can effectively contribute to improvement of long life span characteristics and suppression of the resistance increase caused in accordance with charging and discharging.

Examples 31 to 39

As the positive electrode active material particle A, a nickel composite oxide ($LiNi_{0.8}Co_{0.1}Mn_{0.1}O_2$) having a lamellar crystal structure with the average particle size of 8.4 μm and the BET specific surface area of 0.44 m$^2$/g was prepared. As the positive electrode active material particle $B_4$, an iron phosphate lithium compound ($LiFePO_4$) having an olivine structure with the average particle size of 3.1 μm and the BET specific surface area of 6.5 m$^2$/g was prepared. These positive electrode active material particles and carbon black as a conductive assistant were subjected to dry mixing. An obtained mixture was evenly dispersed in N-methyl-2-pyrrolidone (NMP) in which a vinylidene fluoride resin (PVDF) serving as a binder was dissolved, and slurry was produced, thereby obtaining slurry A. The solid content ratio in the slurry A was set in a manner of positive electrode active material particle A: positive electrode active material particle $B_4$: conductive assistant: PVDF=89.24:2.76:4:4 (mass %). In this case, the mass ratio of the positive electrode active material particle A and the positive electrode active material particle $B_4$ was 97:3.

After aluminum metal foil (thickness of 20 μm) to serve as the positive electrode current collector was coated with the slurry A, NMP was evaporated, and the positive electrode active material layer (membrane thickness of 85 μm) having the positive electrode active material particle A and the positive electrode active material particle $B_4$ was formed on aluminum metal foil, thereby obtaining a positive electrode sheet of Example 31.

In addition, except that the mixture ratio of the positive electrode active material particle A and the positive electrode active material particle $B_4$ was changed to the value (mass ratio) shown in Table 4, in a manner similar to Example 31, positive electrode sheets of Examples 32 to 39 disclosed in Table 4 were produced.

(Evaluation)

Natural graphite was used as the negative electrode active material, which was mixed and dispersed in NMP such that the ratio of natural graphite:PVDF=90:10 (mass %) was achieved, and copper foil (thickness of 10 μm) to be produced as the negative electrode current collector 4 was coated with the mixture. A nonaqueous electrolytic solution having $LiPF_6$ of 1 mol/L dissolved as the electrolyte was used as the electrolytic solution. Thereafter, the negative electrode and the positive electrode were layered via the separator 5 made of polyethylene, and each of the laminate-type secondary batteries was produced.

Using the laminate-type secondary batteries produced by the technique described above, the high-temperature cycle characteristics were evaluated at the temperature of 45° C. under the conditions of the charge rate of 1.0 C, the discharge rate of 1.0 C, the charging end voltage of 4.2 V, and the discharge cutoff voltage of 2.5 V.

The capacity maintenance factor (%) was a value indicated as $100 \times C_{500}/C_{10}$ when the discharge capacity (mAh) after 500 cycles was $C_{500}$ and the discharge capacity (mAh) of the tenth cycle was $C_{10}$.

Table 4 shows the obtained capacity maintenance factors.

TABLE 4

| | Active material A:Active material $B_4$ | Discharge capacity in 10th cycle (mAh) | Capacity maintenance factor (%) |
|---|---|---|---|
| Example 31 | 97:3 | 2221 | 83.7 |
| Example 32 | 90:10 | 2177 | 85.1 |
| Example 33 | 75:25 | 2083 | 87.3 |
| Example 34 | 70:30 | 2052 | 87.5 |
| Example 35 | 60:40 | 1990 | 88.5 |
| Example 36 | 50:50 | 1927 | 89.5 |
| Example 37 | 40:60 | 1865 | 90.0 |
| Example 38 | 10:90 | 1678 | 91.3 |
| Example 39 | 3:97 | 1634 | 91.0 |
| Comparative Example 1 | 100:0 | 2239 | 80.0 |

From the comparison of the capacity maintenance factors of Examples and Comparative Examples, it is possible to know that the lithium-ion secondary batteries which have used the positive electrode active materials of Examples have life spans longer than the lithium-ion secondary batteries which have used the positive electrode active materials of Comparative Examples. Therefore, it is possible to understand that the positive electrode active material of the present embodiment can contribute to improvement of long life span characteristics of the lithium-ion secondary batteries.

Priority is claimed on Japanese Patent Application No. 2015-192852, filed on Sep. 30, 2015, the entire content of which is incorporated herein by reference.

The invention claimed is:

1. A positive electrode active material used for a positive electrode for a lithium-ion secondary battery, the positive electrode active material consisting of:

a positive electrode active material particle A expressed by General Formula (A): $Li_\alpha Ni_x Co_y Mn_{(1-x-y)}O_2$ (where $0<\alpha<1.15$, $0.7 \leq x \leq 0.9$, $0<y \leq 0.2$, and $0<(1-x-y)$); and one kind of positive electrode active material particles B selected from the group consisting of a positive electrode active material particle $B_1$ expressed by General Formula ($B_1$): $Li_\beta Ni_a Co_b Al_{(1-a-b)}O_2$ (where $0<\beta \leq 1.15$, $0.7 \leq a \leq 0.9$, $0<b \leq 0.2$, and $0<(1-a-b)$), and a positive electrode active material particle $B_2$ expressed by General Formula ($B_2$): $Li_\beta Ni_a Co_b Mn_{(1-a-b)}O_2$ (where $0<\beta \leq 1.15$, $0.2 \leq a \leq 0.6$, $0<b \leq 0.8$, and $0<(1-a-b)$) wherein when the sum of the positive electrode active material particle A and the positive electrode active material particle B is 100 parts by mass, a blending quantity of the positive electrode active material particle A ranges of equal to or more than 3 parts by mass and equal to or lower than 97 parts by mass, and a blending quantity of the positive electrode active material particle B ranges of equal to or more than 3 parts by mass and equal to or lower than 97 parts by mass.

2. The positive electrode active material according to claim 1, wherein when the sum of the positive electrode active material particle A and the positive electrode active material particle B is 100 parts by mass, the blending quantity of the positive electrode active material particle A ranges of equal to or more than 70 parts by mass and equal to or lower than 97 parts by mass, and the blending quantity of the positive electrode active material particle B ranges of equal to or more than 3 parts by mass and equal to or lower than 30 parts by mass.

3. A positive electrode comprising:
   a positive electrode active material layer that includes the positive electrode active material according to claim 1, a binding agent, and a conductive assistant.

4. A lithium-ion secondary battery comprising, at least:
   a negative electrode that allows lithium to be inserted in and to escape from;
   an electrolytic solution; and
   the positive electrode according to claim 3.

* * * * *